United States Patent
Hall et al.

(10) Patent No.: US 10,123,613 B2
(45) Date of Patent: Nov. 13, 2018

(54) HEIGHT ADJUSTABLE TABLE

(71) Applicant: LINAK A/S, Nordborg (DK)

(72) Inventors: Ann Mandt Hall, Louisville, KY (US); Todd Davis, Louisville, KY (US)

(73) Assignee: LINAK A/S, Nordborg (DK)

( * ) Notice: Subject to any disclaimer, the term of this patent is extended or adjusted under 35 U.S.C. 154(b) by 376 days.

(21) Appl. No.: 14/890,395

(22) PCT Filed: May 10, 2014

(86) PCT No.: PCT/DK2014/000025
§ 371 (c)(1),
(2) Date: Nov. 10, 2015

(87) PCT Pub. No.: WO2015/058768
PCT Pub. Date: Apr. 30, 2015

(65) Prior Publication Data
US 2016/0106205 A1    Apr. 21, 2016

(30) Foreign Application Priority Data
May 10, 2013   (DK) .................................. 2013 00274

(51) Int. Cl.
A47B 21/02 (2006.01)
A47B 9/00 (2006.01)
A47B 13/08 (2006.01)
A47B 17/02 (2006.01)
A63B 24/00 (2006.01)
(Continued)

(52) U.S. Cl.
CPC .............. *A47B 9/00* (2013.01); *A47B 13/081* (2013.01); *A47B 17/02* (2013.01); *A47B 21/02* (2013.01); *A63B 24/0062* (2013.01); *G05B 15/02* (2013.01); *A47B 2009/046* (2013.01); *A47B 2200/0084* (2013.01); *A63B 2230/75* (2013.01)

(58) Field of Classification Search
CPC ....................... A47B 17/06; A47B 2200/0066
See application file for complete search history.

(56) References Cited

U.S. PATENT DOCUMENTS

| 7,892,148 | B1 | 2/2011 | Stauffer et al. |
| 2014/0096706 | A1 | 4/2014 | Labrosse et al. |
| 2014/0137773 | A1* | 5/2014 | Mandel ................ G06Q 10/109 |
| | | | 108/50.11 |

FOREIGN PATENT DOCUMENTS

| DE | 19604329 A1 | 8/1997 |
| WO | 92/18033 A1 | 10/1992 |

OTHER PUBLICATIONS

International Search Report for corresponding patent application No. PCT/DK2014/000025 dated Aug. 28, 2014.
(Continued)

*Primary Examiner* — Cheung Lee
(74) *Attorney, Agent, or Firm* — Renner, Otto, Boisselle & Sklar, LLP (57) ABSTRACT

The present invention relates to an improved height adjustable table which can assist and motivate the user to use the height adjustable table in a manner which increases health, calorie burn and well-being. This is done by logging how long the table has been in a standing and/or sitting range. The log can be used to calculate the calories burned during use. In another embodiment the log can be used to remind the user of the table to change position during the use of the table.

20 Claims, 4 Drawing Sheets

(51) Int. Cl.
*G05B 15/02* (2006.01)
*A47B 9/04* (2006.01)

(56) References Cited

OTHER PUBLICATIONS

Anonymous: "Calorie Burn Calculator", Jun. 27, 2011 (Jun. 27, 2011), XP055133653, Retrieved from the Internet: URL:http://www.csgnetwork.com/caloriesactburned.html[retrieved on Aug. 6, 2014].
Anonymous: "Logging standing at desk (cross-post from fitbit.com) | MyFitnessPal.com", Feb. 14, 2013 (Feb. 14, 2013), XP055133800, Retrieved from the Internet: URL:http://www.myfitnesspal.com/topics/show/883273-logging-standing-at-desk-cross-post-from-fitbit-com [retrieved on Aug. 7, 2014] & Anonymous: "Calorie-Burn, Activity Points Calculator: Standing Desk Applications", Feb. 7, 2013 (Feb. 7, 2013), XP055133828, Retrieved from the Internet: URL:http://www.ergotron.com/tabid754/language/en-US/defult.aspx [retrieved on Aug. 7, 2014].
Matthew Rogers: "Stand or Die! Tracks Your Time Spent in Front of a Standing Desk", May 17, 2011 (May 17, 2011), XP055133652, Retrieved from the Internet: URL:http:lifehacker.com/5802603/stand-or-die-tracks-your-time-spent-in-front-of-a-standing-desk [retrieved on Aug. 8, 2014].

\* cited by examiner

HEIGHT ADJUSTABLE TABLE

CROSS-REFERENCE TO RELATED APPLICATIONS

This application is a national phase of International Application No. PCT/DK2014/000025 filed May 10, 2014 and published in the English language, which claims the benefit of DK Application No. DK PA201300274 filed on May 10, 2013, which are all hereby incorporated herein by reference.

FIELD OF THE INVENTION

The present invention relates to a height adjustable table and methods for operating such a table. Height adjustable tables are also known as sit/stand desks.

BACKGROUND OF THE INVENTION

A common height adjustable table comprises a frame to which a table top is mounted. The frame is attached to one end of at least one linear actuator in the form of a lifting column. A foot is mounted to the other end of the lifting column. As examples of these types of lifting columns reference is made to WO/2004/040169 A1 and WO 2009/033486 A1 both LINAK A/S. The electrically driven lifting columns are connected to a control and an operation panel. These units are jointly denominated linear actuator systems.

Although height adjustable tables comprising a linear actuator system are becoming more widespread, it is a fact that many users do not make use of its most obvious functionality, i.e. height adjustment. This fact is in contrast to the known benefits that movement during the day has for health, especially for our metabolism. Standing and moving burns more calories than sitting and engages the leg muscles of the user. Apart from the higher calorie burn when standing it is also proven that standing and moving during the day improves circulation, energy, stress and overall well-being of the user. Just the act of going from a seated position to a standing position forces the body to work against gravity and helps strengthen our stabilizer muscles. In general it is recommended that sedentary workers mix sitting and standing during an average workday-sitting or standing for no longer than one hour at a time. A recommended goal is to strive for an extra 120 minutes of standing a workday and to change postures at least 8 to 16 times.

SUMMARY OF THE INVENTION

The objective of the invention is to provide an improved height adjustable table which can assist and motivate the user to use the height adjustable table in a manner which increases health, calorie burn and well-being.

According to the invention this is solved by providing a method for operating a height adjustable table, where the height adjustable table comprises a linear actuator system, and where the linear actuator system comprises at least one linear actuator, a table top, a control and an operating unit with a user interface. The linear actuator system comprises a sit/stand level defining the border between a sitting range and a standing range of the height adjustable table. The method comprises the step of logging the time in which the height adjustable table is in the sitting range and/or the standing range. Logging the time in one or both of these ranges can be used to provide several functions.

Logging the time of each or one of the ranges based on the sit/stand level is considerably easier than logging the time of specific position(s), because it takes account for the daily use the table. If for example the user of the height adjustable desk wants to make small adjustments of the table height during the day, this does not affect the logging. Similar if two users stand at the height adjustable table they are free to set the height of the table such that it accommodates both of them. Again this does not affect the logging of the time.

Hence, in an embodiment the invention comprises the step of calculating the calories burned by the user of the height adjustable table based on the weight of the user and the time in which the height adjustable table is in the standing range. The weight of the user can be a default weight or weight set by the user via the user interface of the operating unit.

In another embodiment the invention comprises the step of setting the sit/stand level via the operating panel. Hereby, the height adjustable table is able to log the time of the standing and/or sitting ranges of the specific user of the table. This evidently provides a more precise logging. This allows the user to measure their progress towards additional standing time during a workday.

In order to further increase the preciseness of the logging and the calculation of the burned calories, the user can set his/her weight via the operating panel. This will enable the height adjustable table to calculate the calories burned on the basis of the weight and time standing. The calculation for calories burned by standing considers weight (user entered or default weight), minutes standing and a MET value. The MET value is the Metabolic Equivalent of Task (MET), or simply metabolic equivalent, which is a physiological measure expressing the energy cost of physical activities.

In an embodiment of the invention the height adjustable table comprises the method step of displaying the calories burned by the user of the height adjustable table.

In yet another embodiment of the invention the method for operating the height adjustable table comprises the step of displaying the accumulated period of time in which the height adjustable table has been in the sitting range and/or the standing range. In a further embodiment of the method for operating the height adjustable table, the method comprises the step of displaying the calories burned by the user of the height adjustable table in the sitting range and/or the standing range.

In an embodiment the operating unit of the height adjustable table comprises a reminder time. In a method step the height adjustable table computes when the logged standing or sitting time has reached the value of the reminder time (default or user set), where after the height adjustable table will remind or alert the user to change position. Reminding or alerting the user via the user interface of the operating unit. In an alternative the user can be reminded or alerted by shortly moving at least one of the linear actuators down or up or a combination of the two. This will cause the table top of the height adjustable table to move and thus provide a tactile reminder or alert. As an alternative or supplement the reminder or alert could be audible. Regardless of the type of reminder or alert, this function will encourage the user of the height adjustable table to change position.

In another embodiment the height adjustable table comprises the step of resetting the logging of the time in which the height adjustable table is in the sitting range and/or the standing range. This will enable the user to retrieve information of the time spend in one or both of the ranges during a period of time desired by the user. This could for example be during a working day.

The present invention also relates to a height adjustable table comprising at least one linear actuator, a table top, a control, an operating panel with a display, and where the control comprises a default sit/stand level defining the border between a sitting range and a standing range. The control comprises means for logging the time in which the height adjustable table is in the sitting range and/or the standing range.

BRIEF DESCRIPTION OF THE DRAWINGS

An embodiment of the invention will be described more fully below with reference to the accompanying drawing, in which.

DETAILED DESCRIPTION OF THE INVENTION

Figure 1:
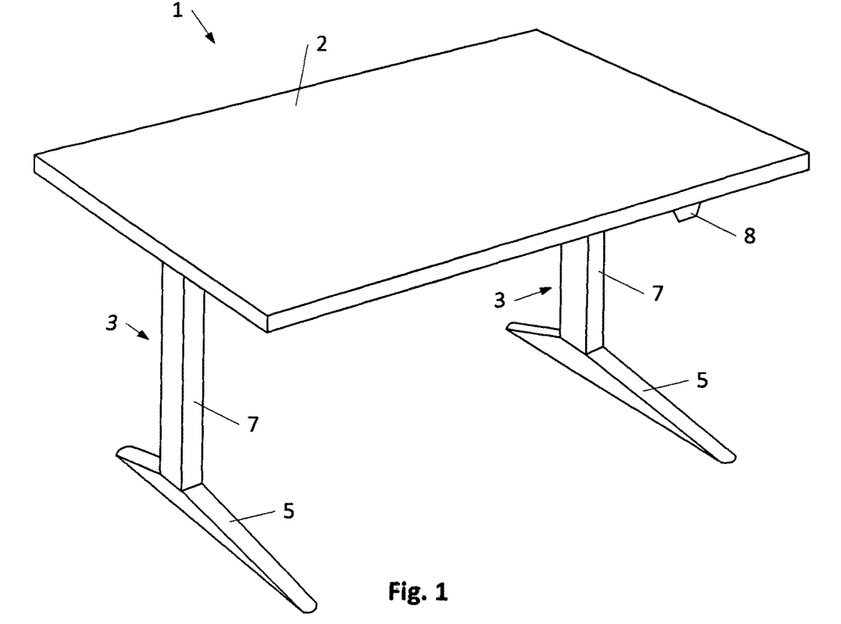
FIG. 1 shows a perspective view of a height adjustable table.

FIG. 1 shows a perspective view of a height adjustable table 1 comprising a table top 2. At each side of the height adjustable table 1 a linear actuator in the form of a lifting column 3 e.g. of the type described in WO2004/100632 A1 LINAK A/S is mounted in a carrying frame 4 (see FIG. 2) onto which the table top 2 is mounted. The other end of each lifting column 3 comprises a foot 5 on which the height adjustable table 1 stands. The lifting columns 3 comprise a motor housing 6 (see FIG. 2) and two or three mutually telescopically arranged profiles. One profile 7 is stationary fixed to the foot 5 and one profile (not referenced) is stationary fixed to the motor housing 6. Each lifting column 3 is driven by means of an electric motor, which through a gear drives a spindle. The spindle is furnished with a spindle nut secured to the telescopically movable profile(s). The height adjustment of the table top 2 is thus performed by the lifting columns 3. The adjustment is achieved by activating the operating panel 8.

Figure 2:
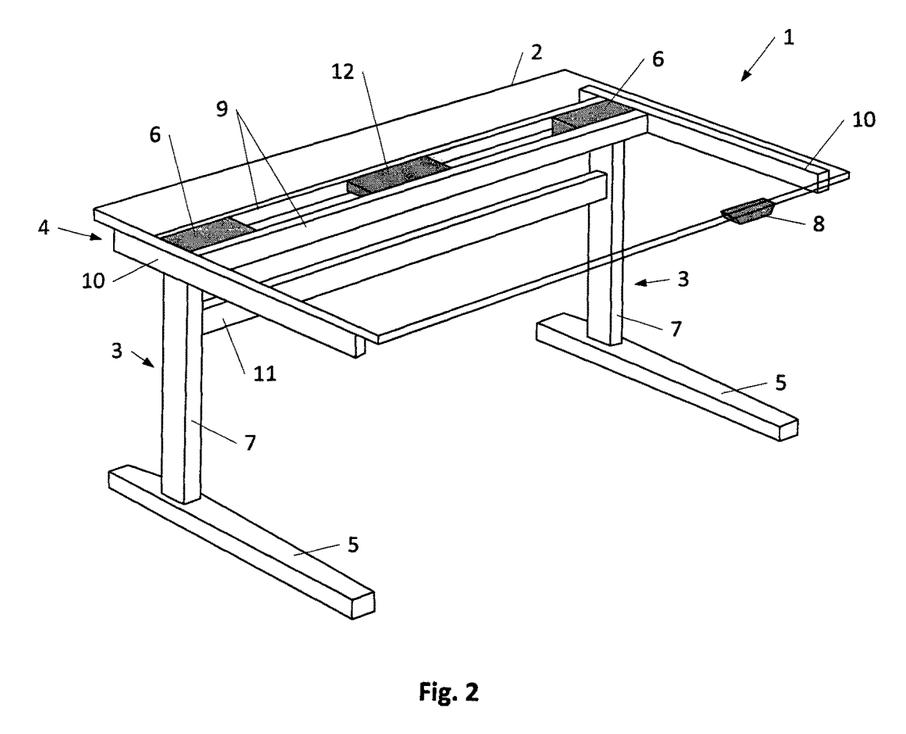
FIG. 2 shows a perspective view of a rough sketch of a height adjustable table.

FIG. 2 illustrates the height adjustable table 1 of FIG. 1, where the table top 2 is depicted as transparent. The carrying frame 4 on which the table top 2 is mounted comprises two parallel longitudinal members 9 and two parallel cross members 10. The two lifting columns 3 are also interconnected by means of an architrave 11 in order to increase the stability of the height adjustable table 1. It is desired to mount the motor housing 6 of the lifting columns 3 and the control box 12 within the dimensions, i.e. length, width and height, given by these longitudinal members 9 and cross members 10. In order to keep within these dimensions, the distance between the two longitudinal members 9 is utilized such that the clearance between the control box 12 and the two longitudinal members exactly renders the mounting of the control box 12 possible. The lifting columns 3 and the operating panel 8 are connected to the control box 12. The lifting columns 3, control box 12 and operating panel 8 constitute a linear actuator system.

Figure 3:
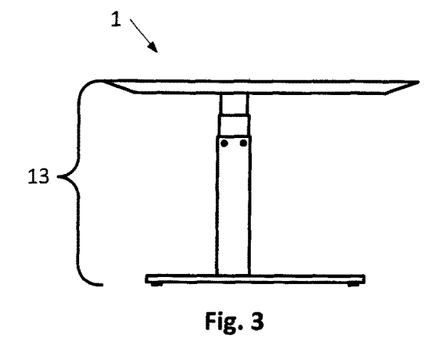
FIG. 3 illustrates a height adjustable table in a sitting position.
Figure 4:
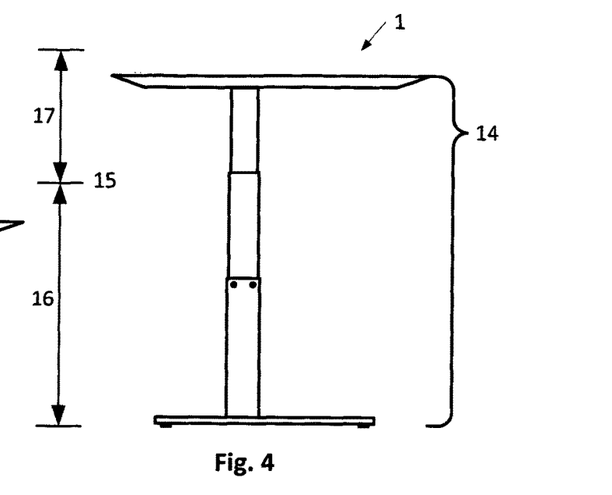
FIG. 4 illustrates the height adjustable table in a standing position.

FIGS. 3 and 4 illustrate a side view of the height adjustable table 1 in a sitting position 13 and a standing position 14, respectively. Since the length of the lifting columns 3 can be adjusted, the sitting position 13 and standing position 14 can be set to accommodate the physical characteristics and personal preferences of each individual user of the height adjustable table 1. The lifting columns 3 comprise potentiometers or Hall sensors for determining the position. The height adjustable table 1 also comprises a sit/stand level 15, defining the border between a sitting range 16 and a standing range 17.

Figure 5:
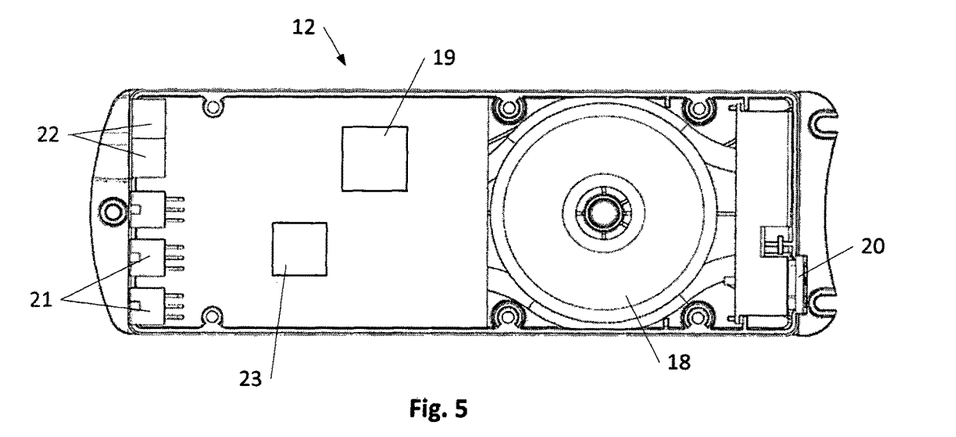
FIG. 5 is a schematic view of the control box of the height adjustable article of furniture.

FIG. 5 is a schematic view of the control box 12 where the top of the housing (see FIG. 4) has been cut away. The control box 12 comprises a power supply 18 (e.g. SMPS or toroidal transformer), a control 19 (e.g. microprocessor), a mains plug 20, plugs for the lifting columns 21 and plugs for the operating panel 22. These main components are located within the housing of the control box 12. The plugs 20,21,22 can be accessed from the outside of the control box housing. The control box 12 further comprises a communication interface 23 for communicating with the operating panel 8. As described later, the linear actuator system can also be operated by another operating unit, such as a tablet, a mobile phone or a PC.

Figure 6:
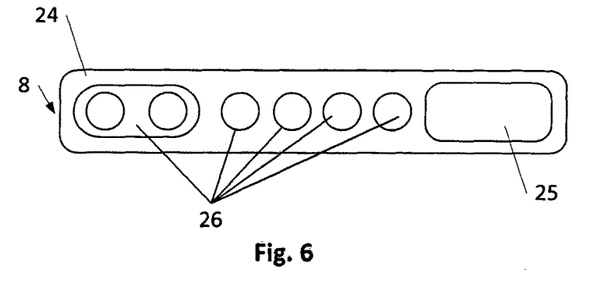
FIG. 6 depicts schematic view of the operating panel, showing the front and parts of the inside.

FIG. 6 depicts the front 24 of an operating panel 8. The front 24 has a display 25 and a number of electric button switches 26.

Figure 7:
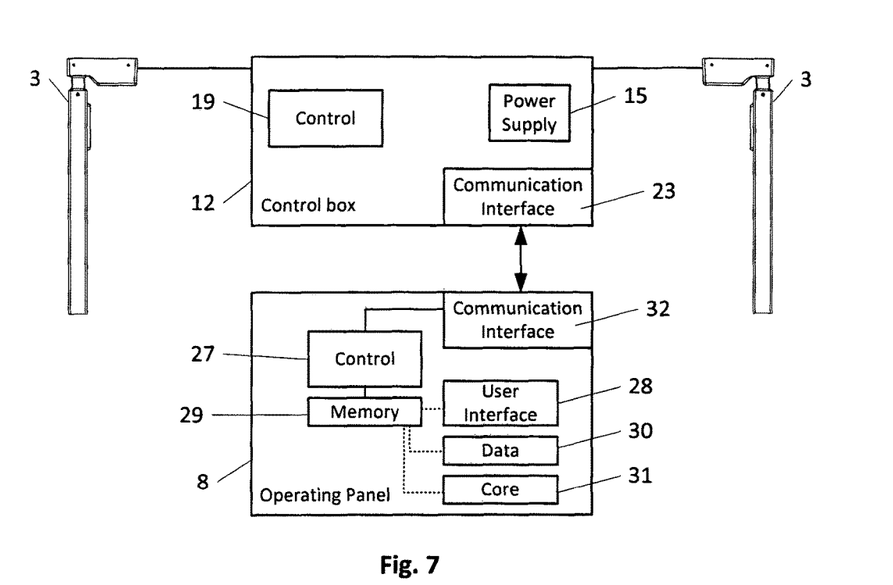
FIG. 7 is a schematic diagram of the linear actuator system of the height adjustable table with a wired connection between the control box and the operating panel.

FIG. 7 depicts a schematic view of the linear actuator system of the height adjustable table 1 in FIGS. 1 and 2. The linear actuator system in FIG. 7 comprises two linear actuators 3, a control box 12 and an operating panel 8. The control box 12 comprises a control 19 and a communication interface 23. The control 19 in control box 12 controls the linear actuators 3 while the control 27 in the operating panel 8 controls the operation of the operating panel 8 in accordance with a user interface 28. User interface 28 comprises computer code which is stored in memory 29 and which when executed by control 27, controls all features of the user interface 28 e.g. buttons 26, display output 25, obtaining user input, etc. Data (block) 30 is also stored in memory 29 and constitutes items such as default weight of the user, user-set weight, default sit/stand level, user-set sit/stand level, reminder timer duration, metabolic equivalent of task value of a person sitting and standing, and other preferences. The core (block) 31 comprises computer code which is stored in memory 29 and which when executed by control 27, performs core functions of the operation panel 8, which may, as explained later, include the various calorie calculations, forming instructions to be sent to the control 19 via the communication interface 32 to control the up/down movement of the height adjustable table 1.

Figure 8:
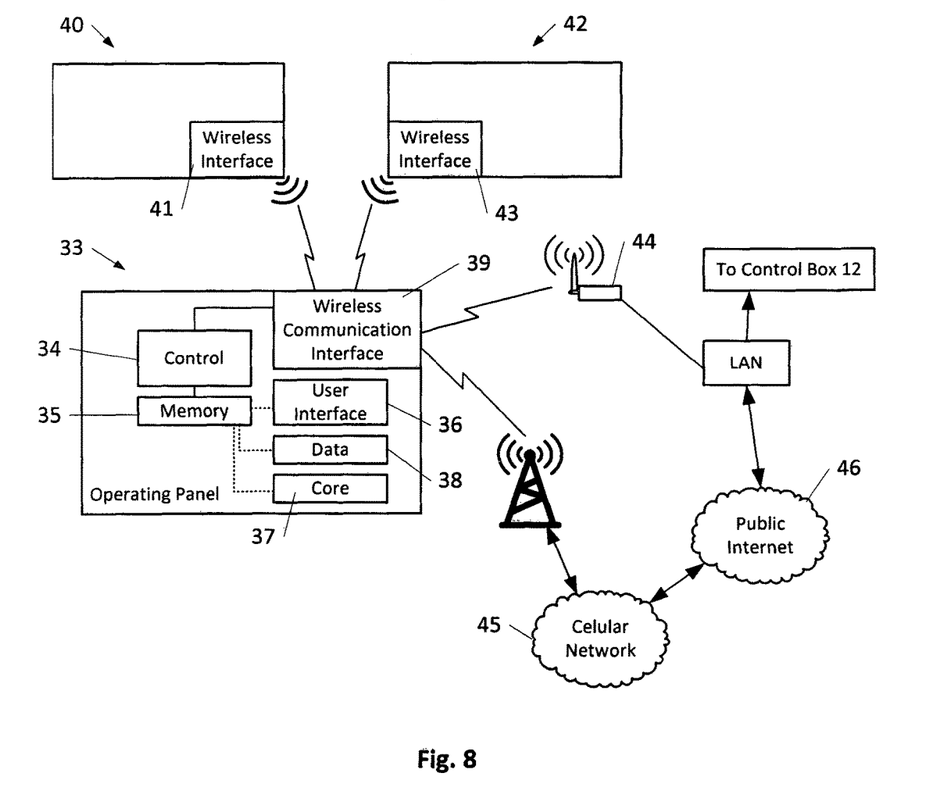
FIG. 8 is a schematic diagram of the linear actuator system of the height adjustable table with a wireless connection between the control box and a wireless device.

FIG. 8 is a block diagram of a wireless device 33 (e.g. tablet, mobile phone, etc.). This also has a control 34 and a memory 35, where the memory 35 stores computer code directed to a user interface 36, core functions 37, as well as data 38. Note that the user interface 36 will be similar in function to the user interface 28 in the operating panel 8, except for the fact that the way a user interacts is different. Hence the user makes selection via interaction with a touch screen instead of buttons switches 26.

The wireless device 33 includes a wireless communication interface 39 configured for wireless communications (e.g. Bluetooth, WiFi, etc.) in different configurations. One example is direct communication with a modified operating panel designated 40, which is the same as panel 8 except it includes wireless communication interface 41. Another example is direct communication with a modified control box 42, which is the same as control box 12 except it further includes a wireless communication interface 43.

The wireless device 33 could also communicate through a wireless router 44 to a local area network (LAN), which is in communication with the control box 12. In another embodiment the device 33 could communicate via a cellular data network 45, via internet 46, and then to the LAN which is in communication with the control box 12.

A PC (not shown) could be similar to operating panel 8 and the wireless device 33. Here the application running on the PC would have a slightly modified user interface that performs similar functions, but through different interface elements for example mouse/keyboard rather than through buttons 26 as in the panel 8 or touchscreen as in the with the wireless device 33 being for example a tablet or mobile phone The operating panel 8 and wireless device 33 are in the context on the present application jointly denominated operating units. As explained the linear actuator system of the height adjustable table 1 can be operated via the control 27,34 of the operating units. The operating unit 8,33 can operate the linear actuator system in a number of different modes of operation (modus operandi) which can be employed individually or in combination. Common to all these modes is that they are intended to increase the health of the user of the linear actuator system.

Via the user interface 28,36 of the operating unit 8,33, the two positions, standing position 14 and sitting position 13 can be set and stored in the memory 29,35. The height adjustable table 1 can hereafter be commanded in these positions via the user interface 28,36.

The control 27,34 of the operating unit 8,33 includes a timer. Executing a code of the core 31,37 the control 27,34 can time the duration in which the height adjustable table 1 is in the sitting range 16 and/or standing range 17. The control 27,34 registers and stores the duration of the sitting range 16 and standing range 17 in the memory 29,35. The measured duration of these two ranges 16,17 can be used to provide several functions via the different modes of operation.

One operation mode is to remind the user of the height adjustable table 1 to change position from a sitting position to standing position or the reverse. This can be done several times during the day. The user is reminded via the user interface 28,36 of the operating unit 8,33. In another operation mode the user is reminded by a small adjustment of the height adjustable table 1. Such an adjustment could be provided by letting the lifting columns 3 move the table top a bit up and down again, all within a few seconds.

If required the user can set the reminder time for the being in the sitting range and standing range via the operating panel 8,33.

In yet another mode the control 27,34 can execute a code of the core 31,37 to display the calories burned by the user of the height adjustable table 1 during his/her sitting and standing positions. The control 27,34 calculates the calories burned on the basis of the weight of the user. To this end the control 27,34 calculates the calories burned based on a default weight which is stored in the memory 29,35. If the user wants a more precise calculation of his/her burned calories, the weight can be entered into the operating unit 8,33 via the user interface 28,36. The control 27,34 will then calculate the burned calories based on the manually set weight. The set weight of the user and the period of time in which the height adjustable table has been in the sitting range 16 and/or standing range 17 and/or are used to calculate total the calories burned by the user. In a further embodiment of this operation mode the calories burned by the user of the height adjustable table 1 is calculated on the basis of a Metabolic Equivalent of Task value (MET). The MET value is the Metabolic Equivalent of Task (MET), or simply metabolic equivalent, which is a physiological measure expressing the energy cost of physical activities. The calories burned are calculated as expressed in this formula:

Calories burned=MET×weight×time

On average the MET value for standing is 2.0 and the average MET value for sitting is 1.3. The calories burned when standing using a MET value of 2.0 can be calculated as:

Calories burned=weight[lbs]×time[minutes]×0.0152

The calories burned when standing using a MET value of 1.3 can be calculated as:

Calories burned=weight[lbs]×time[minutes]×0.0098

If the user of the height adjustable table 1 wishes to use another MET value, this can be set via the user interface 28,36.

The memory 29,35 of the operating unit 8,33 comprises a default sit/stand level 15 defining the border between the sitting range 16 and a standing range 17, see FIGS. 3 and 4. A user defined sit/stand level 15 can also be set via the user interface 28,36 and stored in the memory 29,35. The sit/stand level 15 is used to detect whether the height.

In another mode of operation the calculation of burned calories is computed on the basis of the Body Mass Index (BMI). This is calculated on the basis of the weight and the height of the user. To this end the memory 29,35 comprises a default height. The user can also set his/her height via the user interface, which will be stored in the memory 29,35.

If the user wants to calculate the burned calories himself/herself, the user interface 29,36 of the operating unit 8,33 can display the accumulated duration of minutes spent in the standing range 16 and the sitting range 17. To retrieve the accumulated duration, the user can reset the timing of the ranges at any time. This could for example be at the beginning of a working day.

In another mode of operation of the height adjustable table 1 the users is able to view how often the table is being used. A code of the core 31,37 is executed by the control 27,34 to log how many times the desk has been adjusted (up or down) by sustained movement. A sustained movement of more than 12.7 mm (0.5") has been found suitable. In this mode of operation the user is also able to retrieve how many times the height adjustable table 1 has traveled from the sitting range into the standing range and vice versa. Users can therefore track not only their time standing and calories burned, but also how many times they have gone from sit to stand.

Figure 9:
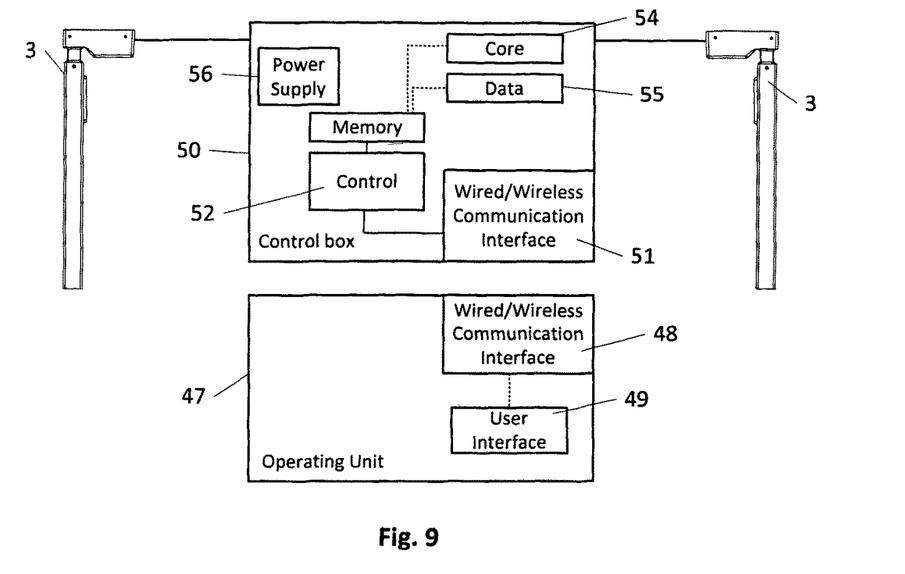
FIG. 9 is a schematic diagram of the linear actuator system of the height adjustable table where the control controls both the linear actuators and the operation of the operating unit.

FIG. 9 illustrates another embodiment of the invention, where the operating unit 47 only comprises wired or wireless communication interface 48 and a user interface 49. The control box 50 comprises a wired or wireless communication interface 51, a control 52, a memory 53, a core block 54, a data block 55 and a power supply 56. Here the control 52 controls both the linear actuators 3 and the operation of the operating unit 47. This embodiment of the invention functions and operates in the same manner as the embodiments described in FIGS. 7 and 8.

The invention claimed is:

1. A method for operating a height adjustable table comprising a linear actuator system, wherein the linear actuator system comprises at least one linear actuator, a table top, a control that comprises a weight of a user of the height adjustable table, an operating unit, a user interface, and a sit/stand level defining the border between a sitting range and a standing range of the height adjustable table, wherein the method comprises steps of logging a time in which the height adjustable table is in the sitting range and/or the standing range; setting the weight of the user via the operating unit; and computing calories burned by the user of the height adjustable table based on the weight of the user and the logged time in which the height adjustable table is in the sitting range or/and the standing range, wherein computing the calories burned by the user is performed using a metabolic equivalent of a task value of a person sitting and/or standing.

2. The method for operating a height adjustable table according to claim 1 further comprising a step of: setting the sit/stand level via the operating unit.

3. The method for operating a height adjustable table according to claim 1 further comprising steps of:
setting the height of the user via the operating units;
computing the calories burned by the user based on a body mass index of the user calculated using the set weight and height of the user.

4. The method for operating a height adjustable table according to claim 1 further comprising a step of displaying on the operating unit the logged period of time in which the height adjustable table has been in the sitting range and/or standing range.

5. The method for operating a height adjustable table according to claim 1 further comprising a step of displaying on the operating unit the calories burned by the user of the height adjustable table in which the height adjustable table is in the sitting range and/or the standing range.

6. The method for operating a height adjustable table according to claim 1, wherein the control comprises a default reminder time, and further comprising steps of:
computing when the height adjustable table has been in the sitting range and/or the standing range in at least the duration of the reminder time, and
alerting or reminding the user to change the height of the height adjustable table.

7. The method for operating a height adjustable table according to claim 1 further comprising a step of resetting the logging of the time in which the height adjustable table is in the sitting range and the standing range.

8. The method for operating a height adjustable table according to claim 1, wherein the operating unit is an operating panel with button switches and display.

9. The method for operating a height adjustable table according to claim 1, wherein the operating unit is a Cell Phone, a tablet or a PC.

10. A height adjustable table comprising a linear actuator system having at least one linear actuator, a control box having a control and communication interface, an operating unit having a control, a communication interface and a user interface, wherein the operating unit comprises a sit/stand level defining the border between a sitting range and a standing range of the height adjustable table, wherein the control comprises a weight of a user of the height adjustable table, wherein a weight of the user is set via the operating unit or is a default weight, and wherein the control of the operating unit comprises means for logging a time in which the height adjustable table is in the sitting range and/or the standing range and computing calories burned by the user of the height adjustable table based on the weight of the user and the logged time in which the height adjustable table is in the sitting range or/and the standing range, wherein computing the calories burned by the user is performed using a metabolic equivalent of a task value of a person sitting and/or standing.

11. A method for operating a height adjustable table comprising a linear actuator system, wherein the linear actuator system comprises at least one linear actuator, a table top, a control, an operating unit, a user interface, and a sit/stand level defining the border between a sitting range and a standing range of the height adjustable table, wherein the method comprises steps of: logging a time in which the height adjustable table is in the sitting range and/or the standing range; setting a weight and a height of a user via the operating unit; and computing calories burned by the user of the height adjustable table using the logged time in which the height adjustable table is in the sitting range and/or the standing range and a body mass index of the user calculated using the set weight and height of the user.

12. The method for operating a height adjustable table according to claim 11 further comprising a step of: setting the sit/stand level via the operating unit.

13. The method for operating a height adjustable table according to claim 11 further comprising at least one of:
displaying on the operating unit the logged period of time in which the height adjustable table has been in the sitting range and/or standing range; and
displaying on the operating unit the calories burned by the user of the height adjustable table in which the height adjustable table is in the sitting range and/or the standing range.

14. The method for operating a height adjustable table according to claim 11, wherein the control comprises a default reminder time, and further comprising steps of:
computing when the height adjustable table has been in the sitting range and/or the standing range in at least the duration of the reminder time, and
alerting or reminding the user to change the height of the height adjustable table.

15. The method for operating a height adjustable table according to claim 11 further comprising a step of resetting the logging of the time in which the height adjustable table is in the sitting range and the standing range.

16. A method for operating a height adjustable table comprising a linear actuator system, wherein the linear actuator system comprises at least one linear actuator, a table top, a control that comprises a weight of a user of the height adjustable table, an operating unit, a user interface, and a sit/stand level defining the border between a sitting range and a standing range of the height adjustable table, wherein the weight of the user is a default weight, and wherein the method comprises steps of logging a time in which the height adjustable table is in the sitting range and/or the standing range; and computing calories burned by the user of the height adjustable table based on the weight of the user and the logged time in which the height adjustable table is in the sitting range or/and the standing range, wherein computing the calories burned by the user of the height adjustable table is performed using a metabolic equivalent of a task value of a person sitting and/or standing.

17. The method for operating a height adjustable table according to claim 16 further comprising a step of: setting the sit/stand level via the operating unit.

18. The method for operating a height adjustable table according to claim 16 further comprising at least one of:
displaying on the operating unit the logged period of time in which the height adjustable table has been in the sitting range and/or standing range; and
displaying on the operating unit the calories burned by the user of the height adjustable table in which the height adjustable table is in the sitting range and/or the standing range.

19. The method for operating a height adjustable table according to claim 16, wherein the control comprises a default reminder time, and further comprising steps of:
computing when the height adjustable table has been in the sitting range and/or the standing range in at least the duration of the reminder time, and
alerting or reminding the user to change the height of the height adjustable table.

20. A height adjustable table comprising a linear actuator system having at least one linear actuator, a control box having a control and communication interface, an operating unit having a control, a communication interface and a user interface, wherein the operating unit comprises a sit/stand level defining the border between a sitting range and a standing range of the height adjustable table, wherein a weight and a height of a user is set via the operating unit, and wherein the control of the operating unit comprises means for logging a time in which the height adjustable table is in the sitting range and/or the standing range and computing calories burned by the user of the height adjustable table using the logged time in which the height adjustable table is in the sitting range and/or the standing range and a body mass index of the user calculated using the set weight and height of the user.

* * * * *